(12) United States Patent
Katsoulis et al.

(10) Patent No.: US 6,596,821 B1
(45) Date of Patent: Jul. 22, 2003

(54) HYDROSILYATION CURED SILICONE RESINS OBTAINED BY FRACTIONATION

(75) Inventors: Dimitris E. Katsoulis, Tokyo (JP); Bizhong Zhu, Midland, MI (US); John R. Keryk, Midland, MI (US); Frederick J. McGarry, Weston, MA (US); Zhongtao Li, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/091,678

(22) Filed: Mar. 5, 2002

(51) Int. Cl.$^7$ ................................................. C08G 77/04
(52) U.S. Cl. ...................... 525/474; 525/477; 525/478; 528/15
(58) Field of Search ............................... 525/474, 477, 525/478; 528/15

(56) References Cited

U.S. PATENT DOCUMENTS

| | | | |
|---|---|---|---|
| 4,116,993 A | | 9/1978 | Bluestein et al. |
| 4,709,054 A | | 11/1987 | Rich |
| 4,778,871 A | | 10/1988 | Newhouse et al. |
| 5,063,267 A | * | 11/1991 | Hanneman et al. ......... 524/284 |
| 5,264,536 A | * | 11/1993 | Radosz ........................ 528/483 |
| 5,416,190 A | * | 5/1995 | Mine et al. .................. 528/492 |
| 5,589,562 A | | 12/1996 | Lichtenhan et al. |
| 5,747,608 A | * | 5/1998 | Katsoulis et al. ............ 525/477 |
| 5,830,950 A | * | 11/1998 | Katsoulis et al. ............ 525/477 |
| 6,046,283 A | | 4/2000 | Katsoulis et al. |
| 6,072,016 A | | 6/2000 | Kobayashi et al. |
| 6,252,030 B1 | | 6/2001 | Zank et al. |
| 6,310,146 B1 | | 10/2001 | Katsoulis et al. |

FOREIGN PATENT DOCUMENTS

EP          1065248 A1  *  1/2001  ........... C08L/83/04

* cited by examiner

*Primary Examiner*—Robert Dawson
*Assistant Examiner*—Jeffrey B. Robertson
(74) *Attorney, Agent, or Firm*—Reising Ethington Barnes Kisselle Learman & McCulloch PC; Kevin S. MacKenzie

(57) ABSTRACT

A process for producing a cured silsesquioxane resin. The process includes fractionating the silsesquioxane resin a plurality of times utilizing an organic solvent in combination with an organic non-solvent. The fractionated resin is then stripped of excess solvent. The stripped resin is then mixed with a cross-linking compound to form a curable composition. The curable composition is cured to form a cured resin having high fracture toughness and strength without the loss of elastic modulus.

28 Claims, No Drawings

HYDROSILYATION CURED SILICONE RESINS OBTAINED BY FRACTIONATION

FIELD OF THE INVENTION

The invention relates to a process for producing a cured silsesquioxane resin having high fracture toughness and strength without loss of elastic modulus. With more particularity the invention relates to a fractionation process for producing a cured silsequioxane resin having high fracture toughness and strength without the loss of elastic modulus.

BACKGROUND OF THE INVENTION

Silsesquioxane resins have seen increased use in industrial applications in the automotive, aerospace, civilian and military and manufacturing industries. Silsequioxane resins exhibit excellent heat and fire resistant properties that are desirable for such applications. These properties make the silsesquioxane resins attractive for use in fiber-reinforced composites for electrical laminates, structural use in automotive components, aircraft and naval vessels. Thus, there exists a need for rigid silsesquioxane resins having increased flexural strength, flexural strain, fracture toughness, and fracture energy, without significant loss of modulus or degradation of thermal stability. In addition, rigid silsesquioxane resins have low dielectric constants and are useful as interlayer dielectric materials. Rigid silsesquioxane resins are also useful as abrasion resistant coatings. These applications require that the silsesquioxane resins exhibit high strength and toughness.

Conventional thermoset networks of high cross-link density, such as silsesquioxane resins, typically suffer from the drawback that when measures are taken to improve a mechanical property such as strength, fracture toughness, or modulus, one or more of the other properties suffers a detriment.

Various methods and compositions have been disclosed in the art for improving the mechanical properties of silicone resins including: 1) modifying the silicone resin with a rubber compound, as disclosed in U.S. Pat. No. 5,747,608 which describes a rubber-modified resin and U.S. Pat. No. 5,830,950 which describes a method of making the rubber-modified resin; 2) adding a silicone fluid to a silicone resin as disclosed in U.S. Pat. No. 5,034,061 wherein a silicone resin/fluid polymer is adapted to form a transparent, shatter-resistant coating.

While the above referenced patents offer improvements in the toughness of silicone resins, there is an additional need to further improve the toughness of silicone materials for use in high strength applications, such as those described above.

Therefore, it is an object of this invention to provide a process that may be utilized to prepare a cured silsesquioxane resin having high fracture toughness with minimal loss of modulus.

SUMMARY OF THE INVENTION

As described above, silsesquioxane copolymer resins can be formulated and cured into polymer products having very useful properties. However, the uncured copolymers are usually synthesized or produced having quite a broad range of molecular weights. In accordance with this invention, such a resin is fractionated into portions with smaller molecular weight ranges and each portion cured separately in the same desired formulation. Upon comparison of the separately cured samples it is found that a cured resin from a suitably selected molecular weight portion has selected superior properties as compared to the cured whole batch, e.g., a better combination of high fracture toughness and strength without loss of elastic modulus.

Thus, in accordance with a preferred embodiment of the invention, a process is provided for producing a cured silsesquioxane resin having high fracture toughness and strength without loss of elastic modulus comprising the steps of:

a) providing a silsesquioxane resin;

b) fractionating the silsesquioxane resin a plurality of times utilizing an organic solvent or using other approaches such as column fractionation or supercritical fluid extraction or dialysis methods or electrophoresis methods or any other method that separates polymeric mixtures according to molecular weight differences. When organic solvent is used for fractionation then step c follows:

c) stripping the silsesquioxane resin of step b) of excess solvent;

d) selecting an appropriate fraction;

e) mixing the silsesquioxane resin of step c) with a cross-linking compound to form a curable composition;

f) curing the curable composition to form a cured resin having a higher fracture toughness than that of the resin of step a).

DETAILED DESCRIPTION OF THE PREFERRED EMBODIMENTS

This invention relates to a hydrosilylation reaction curable composition and process that is used to prepare a cured silsesquioxane resin. This curable composition comprises: (A) a silsesquioxane copolymer, (B) a silicon hydride containing hydrocarbon, silane or siloxane as a crosslinker, (C) a catalyst, (D) an optional inhibitor and (E) an optional solvent.

Component (A) is a silsesquioxane copolymer comprising units that have the empirical formula $R^1{}_a R^2{}_b R^3{}_c SiO_{(4-a-b-c)/2}$, wherein: a is zero or a positive number, b is zero or a positive number, c is zero or a positive number, with the provisos that $0.8 \leq (a+b+c) \leq 3.0$ and component (A) has an average of at least 2 $R^1$ groups per molecule, and each $R^1$ is independently selected from monovalent hydrocarbon groups having aliphatic unsaturation, and each $R^2$ and each $R^3$ are independently selected from monovalent hydrocarbon groups and hydrogen. Preferably, $R^1$ is an alkenyl group such as vinyl or allyl. Typically, $R^2$ and $R^3$ are nonfunctional groups selected from the group consisting of alkyl and aryl groups. Suitable alkyl groups include methyl, ethyl, isopropyl, n-butyl, and isobutyl groups. Suitable aryl groups include phenyl groups. Suitable silsesquioxane copolymers for component (A) are exemplified by $(PhSiO_{3/2})_{0.75}(ViMe_2SiO_{1/2})_{0.25}$, where Ph is a phenyl group, Vi represents a vinyl group, and Me represents a methyl group.

Component (B) is a silicon hydride containing hydrocarbon having the general formula $H_a R^1{}_b SiR^2 SiR^1{}_c H_d$ where $R^1$ is a monovalent hydrocarbon group and $R^2$ is a divalent hydrocarbon group and where a and $d \geq 1$, and $a+b=c+d=3$. The general formula $H_a R^1_b SiR^2 SiR^1_c H_d$ although preferred in the present invention is not exclusive of other hydrido silyl compounds that can function as cross-linkers of the component (A). Specifically a formula such as the above, but where $R^2$ is a trivalent hydrocarbon group can also be suitable as component (B). Other options for component (B) can be mixtures of hydrido-silyl compounds as well.

Suitable silicon hydride containing hydrocarbons of component (B) with the aforementioned formula can be prepared by a Grignard reaction process. For example, one method for making a silyl-terminated hydrocarbon for use in this invention includes heating to a temperature of room temperature to 200° C., preferably 50° C., a combination of magnesium and a solvent such as diethylether or tetrahydrofuran. A di-halogenated hydrocarbon, such as dibromobenzene is then added to the magnesium and solvent over a period of several hours.

After complete addition of the di-halogenated hydrocarbon, a halogenated silane, such as dimethylhydrogenchlorosilane, is then added, and an optional organic solvent can also be added. The resulting mixture is then heated for a period of several hours at a temperature of 50 to 65° C. Any excess halogenated silane is then removed by any convenient means, such as neutralization with a saturated aqueous solution of $NH_4Cl$. The resulting product can then be dried with a drying agent such as magnesium sulfate and then purified by distillation.

An example of such a silicon hydride containing hydrocarbon produced by a Grignard reaction includes p-bis(dimethylsilyl)benzene which is commercially available from Gelest, Inc. of Tullytown, Pa.

Component (B) may also be a silane or siloxane that contains at least two silicon hydride functionalities that will cross-link with the vinyl group of component (A). Examples of suitable silanes and siloxanes that may be utilized as component (B) include diphenylsilane and hexamethyltrisiloxane. Such compounds are commercially available from Gelast, Inc. of Tullytown, Pa. and United Chemical Technologies of Bristol, Pa.

Components (A) and (B) are added to the composition in amounts such that the molar ratio of silicon bonded hydrogen atoms (SiH) to unsaturated groups (C=C) (SiH:C=C) ranges from 1.0:1.0 to 1.5:1.0. Preferably, the ratio is in the range of 1.1:1.0 to 1.5:1.0. If the ratio is less than 1.0:1.0, the properties of the cured silsesquioxane resin will be compromised because curing will be incomplete. The amounts of components (A) and (B) in the composition will depend on the number of C=C and Si—H groups per molecule. However, the amount of component (A) is typically 50 to 98 weight % of the composition, and the amount of component (B) is typically 2 to 50 weight % of the composition.

Component (C) is a hydrosilylation reaction catalyst. Typically, component (C) is a platinum catalyst added to the composition in an amount sufficient to provide 1 to 10 ppm of platinum based on the weight of the composition. Component (C) is exemplified by platinum catalysts such as chloroplatinic acid, alcohol solutions of chloroplatinic acid, dichlorobis(triphenylphosphine)platinum(II), platinum chloride, platinum oxide, complexes of platinum compounds with unsaturated organic compounds such as olefins, complexes of platinum compounds with organosiloxanes containing unsaturated hydrocarbon groups, such as Karstedts catalyst (i.e. a complex of chloroplatinic acid with 1,3-divinyl-1,1,3,3-tetramethyldisiloxane) and 1,3-diethenyl-1,1,3,3-tetramethyldisiloxane, and complexes of platinum compounds with organosiloxanes, wherein the complexes are embedded in organosiloxane resins. A particularly preferred catalyst is a 0.5% platinum containing platinum-divinyltetramethyidisiloxane complex commercially available from Dow Corning Corporation, Midland, Mich.

Component (D) may include an optional catalyst inhibitor, typically added when a one part composition is prepared. Suitable inhibitors are disclosed in U.S. Pat. No. 3,445,420 to Kookootsedes et al., May 20, 1969, which is hereby incorporated by reference for the purpose of describing catalyst inhibitors. Component (D) is preferably an acetylenic alcohol such as methylbutynol or ethynyl cyclohexanol. Component (D) is more preferably ethynyl cyclohexanol. Other examples of inhibitors include diethyl maleate, diethyl fumamate, bis(2-methoxy-1-methylethyl) maleate, 1-ethynyl-1-cyclohexanol, 3,5-dimethyl-1-hexyn-3-ol, 2-phenyl-3-butyn-2-ol, N,N,N',N'-tetramethylethylenediamine, ethylenediamine, diphenylphosphine, diphenylphosphite, trioctylphosphine, diethylphenylphosphonite, and methyldiphenylphosphinite.

Component (D) is present at 0 to 0.05 weight % of the hydrosilylation reaction curable composition. Component (D) typically represents 0.0001 to 0.05 weight % of the curable composition. Component (D) preferably represents 0.0005 to 0.01 weight percent of the total amount of the curable composition. Component (D) more preferably represents 0.001 to 0.004 weight percent of the total amount of the curable composition.

Components (A), (B), (C) and (D) comprise 10 to 100 weight % of the composition. The composition may further comprise one or more optional components including a solvent (E).

The hydrosilylation reaction curable composition comprising components (A), (B), and (C), (D) and any optional components can be dissolved in component (E), an optional solvent. Typically, the amount of solvent is 0 to 90 weight %, preferably 0 to 50 weight % of the curable composition. The solvent can be an alcohol such as methyl, ethyl, isopropyl, and t-butyl alcohol; a ketone such as acetone, methylethyl ketone, and methyl isobutyl ketone; an aromatic hydrocarbon such as benzene, toluene, and xylene; an aliphatic hydrocarbon such as heptane, hexane, and octane; a glycol ether such as propylene glycol methyl ether, dipropylene glycol methyl ether, propylene glycol n-butyl ether, propylene glycol n-propyl ether, and ethylene glycol n-butyl ether; a halogenated hydrocarbon such as dichloromethane, 1,1,1-trichloroethane and methylene chloride; chloroform; dimethyl sulfoxide; dimethyl formarnide; acetonitrile and tetrahydrofuran. A preferred solvent is toluene.

The curable composition of the present invention is preferably a two part composition. The first part comprising component (A) is prepared by a fractionation technique that will be described in more detail below. The second part is prepared by mixing component (B) with component (C) and any optional compounds such as component (D) and component (E) and thereafter keeping the first and second parts separate. The first and second parts are mixed immediately before use.

The mixing of the curable composition of the present invention may also include the step of degassing the composition before curing. Degassing is typically carried out by subjecting the composition to a mild vacuum.

As referenced above the process of the present invention includes that component (A) is subjected to a fractionation prior to combing the fractions with other components. The silsesquioxane resin of component (A) is fractionated using an organic solvent in combination with an organic non-solvent (a solvent in which the silsequioxane resin is not soluble), preferably reagent grade methyl alcohol, although other organic solvents that are a poor solvent for silsesquioxane may be utilized by the present invention. The fractionation process is preferably performed utilizing a silsequioxane resin dispersed in a solvent such as toluene that is stirred as the fractionation organic solvent is added to the solution. The mixture of the silsesquioxane resin and organic solvent is allowed to separate until two clear phases are formed. The lower positioned or higher molecular weight fraction is removed leaving the upper phase. The upper phase may then be subjected to another fractionation using the same organic solvent and method outlined above.

The process of the present invention preferably includes fractionating component (A) three times utilizing the method described above, yielding four different phases. Each fraction can then be combined with components (B), (C), (D) and (E) as described above and subjected to various curing operations, as described in the examples section, to form a cured silsesquioxane resin. It must also be pointed out that recombination of selected fractions can become part of the process if one chooses to modulate the molecular weights and percent functionalities of component (A).

EXAMPLES

The following examples are intended to illustrate the invention to those skilled in the art and should not be interpreted as limiting the scope of the invention as set forth in the appended claims.

Reference Example 1

Three Point Flexural Testing

The three point bending test was performed on an Instron 4500 per ASTM standard D 790-961. The cured resin specimens prepared in the Examples described below were cut into 5.08 cm×1.27cm specimens using a band saw. The specimens were then machined to a thickness of 0.25 cm. The specimens were tested using a cross head speed of 1 mm/min and a support span of 3.81 cm.

During testing, force-displacement curves were recorded. The toughness of the cured resin was obtained as the area under the stress-strain curves. The flexural strength was calculated using the peak force as:

$$S=3PL/2bd^2$$

where S is the stress in the outer surface at the mid span, P the maximum load, L the support span, and b and d are the width and thickness of the beam. The maximum strain was calculated, using the maximum displacement, as:

$$\epsilon=6Dd/L^2$$

where $\epsilon$ is the strain at break and D is the maximum displacement. The slope of the steepest initial straight-line portion of the load-displacement curve was taken as the Young's modulus.

Reference Example 2

Fracture Toughness Testing

The plane strain fracture toughness, $K_{Ic}$, was obtained per ASTM D 5045-96, and the critical strain energy release rate, $G_{Ic}$, was calculated from $K_{Ic}$ based on Linear Elastic Fracture Mechanics (LEFM) assumptions. 5.08 cm×0.95 cm samples were cut using a band saw and a notch was cut at the center of the specimen. A natural crack extending from the root of the notch to about half of the width was produced by gently tapping a sharp razor blade into the notch. Samples were conditioned at 73° C. for at least twenty-four hours before testing to allow full relaxation of deformation. The displacement rate of the test was 10 mm/minute with a support span of 3.81 cm.

$$K_{Ic}=(P/(BW^{1/2}))f(x)$$

where P is the highest load and:

$$f(x)=6x^{1/2}(1.99-x(1-x)(2.15-3.93x+2.7x^2))/((1+2x))(1-x)^{3/2})$$

where x is the pre-crack to specimen width ratio, a/W. After the test the pre-crack length was measured. Only those specimens with a value between 0.45 to 0.55 were considered valid. The variation of x across the thickness should be less than 10%. The validity of the test was further ensured by comparing the sample dimensions with the estimated plastic zone size enlarged by approximately 50:

$$B,a,(W-a)>2.5(K_{Ic}/\gamma_y)^2$$

where $\gamma_y$ is the yield stress of the sample.

$G_{Ic}$ was calculated by:

$$G_{Ic}=K^2_{Ic}(1-v^2)/E$$

where upsilon, the Poisson's ratio of the resin, was neglected to simplify the experiment. For a glassy polymer with a Poisson's ratio of 0.3, $G_{Ic}$ was exaggerated by about 9%. However, the relative ranking of $G_{Ic}$ values would not be obscured since the change of the square of the Poisson's ratio is usually small from one resin to another of similar stiffness.

Reference Example 3

Dynamic Mechanical Analysis

Dynamic mechanical analysis was carried out on a Seiko Dynamic Mechanical Rheology Station DMS 200. A specimen 20 mm long, 4 mm wide and 1 mm thick was mounted in two grips 14 mm apart. The specimen was then subjected to a sinusoidal tensile displacement at a frequency of 1 Hertz. The tension was measured and the storage and loss moduli and the loss factor were calculated. The tests were performed at temperatures ranging from −150 to 350° C. All tests were performed in a nitrogen environment with a gas flow rate of 200 ml/min.

Example 1

A silsesquioxane copolymer having the $(PhSiO_{3/2})_{0.75}(ViMe_2SiO_{1/2})_{0.25}$ where Ph is a phenyl group, Vi represents a vinyl group, and Me represents a methyl group was utilized as Component A. 2000 grams of a 50 percent toluene solution of $(PhSiO_{3/2})_{0.75}(ViMe_2SiO_{1/2})_{0.25}$ silicone resin was charged to a 5 liter 3-neck round bottom flask having a bottom drain and fitted with a mechanical stirrer.

1,211 grams of reagent grade methyl alcohol was added while stirring. The phases were permitted to separate until both phases were clear. The lower fraction, Fraction 1 was removed via the bottom drain. Fraction 1 had a weight of 858.8 grams. The remaining upper phase was combined with 498.9 grams of methyl alcohol while stirring. As described above, the phases were allowed to separate until clear and Fraction 2 was then removed from the bottom of the flask. Fraction 2 weighed 143.78 grams. Next, 751.1 grams of methyl alcohol was then added to the remaining top phase and the phases were allowed to separate until clear. Fraction 3 was removed from the bottom of the flask. Fraction 3 weighed 52.03 grams. The remaining top phase was named Fraction 4 and weighed 558.83 grams.

The four fractions were stripped on a rotary evaporator at 100° C. at less than 10 mm Hg vacuum. The stripped fraction weights were as follows: Fraction 1: 1,529.24 grams, Fraction 2: 102 grams, Fraction 3: 40.24 grams, Fraction 4: 309.33 grams. After the stripping operation, fractions 1, 2, and 3 were solids while fraction 4 was a very stiff viscous liquid. Table 1 contains GPC molecular weight data based on a THF/polystyrene standard including: the number average molecular weight (Mn), weight average molecular weight (Mw) and the polydispersity (Mn/Mw) for the unfractionated resin as well as each of the four fractions.

TABLE 1

| Material | Mn | Mw | Mw/Mn |
| --- | --- | --- | --- |
| Un-fractionated | 1,419 | 1,770 | 1.248 |
| Fraction 1 | 1,556 | 1,972 | 1.268 |
| Fraction 2 | 1.553 | 1,888 | 1.215 |
| Fraction 3 | 1,538 | 1,821 | 1.184 |
| Fraction 4 | 1,158 | 1,301 | 1.124 |

Component A (i.e.: any of the Fractions 1–4 or the unfractioned resin) was then combined with Components B and C to form a cured resin.

The resin copolymer was in a 75% toluene solution as shipped. To reduce the toluene content the solution was heated at 50–60° C. under vacuum for 30 minutes. Approximately 40–50% of the toluene was removed from the resin solution. After cooling of the resin to room temperature, Component A was combined with Components B and C. The mixture was transferred into a Teflon coated aluminum mold. The mold was placed in a room temperature vacuum for ten minutes to remove air trapped in the previous mixing step. Next the mold was put in an air-circulating oven for curing. The cure sequence was as follows: 85° for 24 hours, 150° C. for 8 hours, 200° C. for 24 hours, after which the casting was cooled slowly to room temperature.

The resin of Component (A) was cross linked by the carbon-carbon linkage formed by the addition of silicon hydride groups on the cross linker to the vinyl groups on the resin. Various cross linkers and fractions were used to produce cured resins. The molar ratio of hydride groups to vinyl groups was maintained at approximately 1.1 to 1.0. Table 2 lists the recipe for various combinations of cross linkers and resins, while Table 3 details the mechanical properties of the different processes evaluated by the test methods in the reference examples. The parenthetical values shown in Table 3 indicate standard deviation values of the detailed numbers.

TABLE 2

| Sample | Crosslinker type and molar ratio | Component A | Resin weight (grams) | P* weight (grams) | D** weight (grams) | B*** weight (grams) | Mass ratio of crosslinker/component A resin |
| --- | --- | --- | --- | --- | --- | --- | --- |
| 1 | P | unfractionated | 60 | 12.67 | 0 | 0 | 0.21 |
| 2 | D:P 3:7 | unfractionated | 60 | 8.87 | 4.3 | 0 | 0.22 |
| 3 | D:P 3:7 | Fraction 1 | 60 | 7.87 | 3.82 | 0 | 0.19 |
| 4 | D:P 3:7 | Fraction 4 | 60 | 10.15 | 4.92 | 0 | 0.25 |
| 5 | D:P 5:5 | unfrationated | 60 | 6.34 | 7.17 | 0 | 0.23 |
| 6 | D:P 5:5 | Fraction 1 | 60 | 5.62 | 6.36 | 0 | 0.20 |
| 7 | D:P 5:5 | Fraction 4 | 60 | 7.25 | 8.2 | 0 | 0.26 |
| 8 | D:P 7:3 | unfractionated | 60 | 3.8 | 10.03 | 0 | 0.23 |
| 9 | D:P 7:3 | Fraction 1 | 60 | 3.37 | 8.91 | 0 | 0.20 |
| 10 | D:P 7:3 | Fraction 4 | 60 | 4.35 | 11.48 | 0 | 0.26 |
| 11 | B | Fraction 4 | 60 | 0 | 0 | 15.27 | 0.25 |

*P represents diphenylsilane;
**D represents hexamethyltrisiloxane;
***B represents 1,4-bis(dimethylsilyl)benzene.

TABLE 3

| Sample | Crosslinker type and molar ratio | Young's modulus (Ksi) | Flexural strength (Ksi) | Flexural strain (%) | Toughness (Psi) | Klc (MPam$^{1/2}$) | Glc (J/m$^2$) |
|---|---|---|---|---|---|---|---|
| 1 | P | 204 (7.37) | 6.89 (0.29) | 7.35 (0.96) | 39.29 (8.2) | 0.35 (0.02) | 87.68 (10.55) |
| 2 | D:P 3:7 | 164.2 (8.27) | 4.98 (0.19) | 5.94 (1.16) | 27.20 (7.69) | 0.47 (0.03) | 155.02 (11.43) |
| 3 | D:P 3:7 | 202.00 (7.71) | 4.92 (0.44) | 3.48 (0.64) | 11.85 (3.58) | 0.45 (0.04) | 146.3 (26.57) |
| 4 | D:P 3:7 | 203.8 (2.87) | 5.36 (0.16) | 6.34 (0.21) | 46.78 (7.44) | 1.09 (0.17) | 867.3 (250.9) |
| 5 | D:P 5:5 | 167.54 (5.41) | 5.06 (0.21) | 7.31 (0.37) | 30.10 (2.80) | 0.49 (0.04) | 210.23 (34.34) |
| 6 | D:P 5:5 | 163.4 (4.57) | 6.09 (0.76) | 6.09 (0.76) | 22.53 (3.8) | 0.49 (0.04) | 211.4 (38.93) |
| 7 | D:P 5:5 | 153.43 (4.08) | 7.33 (0.50) | 7.33 (0.50) | 46.98 (4.95) | .92 (0.07) | 823.3 (128.6) |
| 8 | D:P 7:3 | 137.78 (5.22) | 8.63 (0.78) | 8.63 (0.78) | 36.27 (1.74) | .72 (0.05) | 558.72 (69.73) |
| 9 | D:P 7:3 | 129.44 (7.12) | 8.40 (0.43) | 8.40 (0.43) | 29.96 (1.15) | 0.54 (0.07) | 306.5 (83.81) |
| 10 | D:P 7:3 | 84.2 (3.56) | 5.9 (1.0) | 5.9 (1.0) | 23.45 (3.81) | 0.84 (0.06) | 1218 (166.9) |
| 11 | B | 201.6 (8.33) | 3.31 (0.13) | 3.31 (0.13) | NA | 1.41 (0.06) | 1443.7 (128) |

The cured silsesquioxane resin prepared by curing the fourth fraction of the hydrosilylation reaction curable composition of this invention has superior mechanical properties over those of conventional silsesquioxane resins. Typically, the cured silsesquioxane resin produced utilizing the fourth fraction has: a fracture toughness value of 1.1 MPam$^{1/2}$ and a critical strain release energy of 840 J/m$^2$ which is greater than conventional silsequioxane resins.

While a preferred embodiment is disclosed, a worker in this art would understand that various modifications would come within the scope of the invention. Thus, the following claims should be studied to determine the true scope and content of this invention.

What is claimed is:

1. A process for producing a cured silsesquioxane resin having high fracture toughness and strength without loss of elastic modulus comprising the steps of:
   a) providing a silsesquioxane resin;
   b) fractionating the silsesquioxane;
   c) selecting an appropriate fraction;
   d) mixing the silsesquioxane resin of step c) with a cross-linking compound to form a curable composition;
   e) curing the curable composition to form a cured resin having a higher fracture toughness than that of the resin of step a).

2. The process of claim 1 wherein the fractionating step may be performed utilizing a process selected from the group consisting of: organic solvent fractionation, column fractionation, supercritical fluid extraction, dialysis, and electrophoresis.

3. The process of claim 1 wherein the fractionating step is an organic solvent fractionation repeated a plurality of times.

4. The process of claim 3 further including the step of stripping the silsesquioxane resin of step b) of excess solvent.

5. The process of claim 1 wherein the silsesquioxane resin comprises a copolymer resin.

6. The process of claim 5 wherein the silsesquioxane resin is dispersed in a second organic solvent.

7. The process of claim 6 wherein the second organic solvent comprises toluene.

8. The process of claim 6 further including the step of removing a portion of the second organic solvent prior to the fractionating step b).

9. The process of claim 5 wherein the copolymer resin comprises, a copolymer resin having the empirical formula $R^1_aR^2_bR^3_cSiO_{(4-a-b-c)/2}$, wherein: a is zero or a positive number, b is zero or a positive number, c is zero or a positive number, with the provisos that $0.8 \leq (a+b+c) \leq 3.0$ and component (A) has an average of at least 2 $R^1$ groups per molecule, and each $R^1$ is independently selected from monovalent hydrocarbon groups having aliphatic unsaturation, and each $R^2$ and each $R^3$ are independently selected from monovalent hydrocarbon groups and hydrogen.

10. The process of claim 9 wherein the silsesquioxane resin comprises $(PhSiO_{3/2})_{0.75}(ViMe_2SiO_{1/2})_{0.25}$, where Ph is a phenyl group, Vi represents a vinyl group, and Me represents a methyl group.

11. The process of claim 3 wherein the organic solvent comprises methyl alcohol.

12. The process of claim 3 wherein the fractionating step b) comprises mixing the silsesquioxane resin with the organic solvent and thereafter allowing the mixture to separate into two phases and then removing the bottom or precipitated higher molecular weight phase and thereafter repeating the process utilizing the upper phase as the silsesquioxane resin.

13. The process of claim 12 wherein the fractionating step b) is repeated 3 times producing 3 bottom phase fractions and a final upper phase fraction.

14. The process of claim 3 wherein fractions produced from the plurality of fractionation steps are recombined to produce a desired molecular weight distribution.

15. The process of claim 13 wherein the final upper phase fraction is mixed with the cross-linking compound in step d).

16. The process of claim 1 wherein the cross-linking compound comprises a silicon hydride containing hydrocarbon having the general formula: $H_aR^1_bSiR^2SiR^1_cH_d$ where $R^1$ is a monovalent hydrocarbon group and $R^2$ is a divalent hydrocarbon group and where a and $d \geq 1$, and $a+b=c+d=3$.

17. The process of claim 1 wherein the cross-linking compound comprises a silicon hydride containing hydrocarbon having the general formula: $H_aR^1_bSiR^2SiR^1_cH_d$ where $R^1$ is a monovalent hydrocarbon group and $R^2$ is a trivalent hydrocarbon group and where a and $d \geq 1$, and $a+b=c+d=3$.

18. The process of claim 17 wherein the cross-linking compound comprises 1, 3, 5 trisdimethylsilylbenzene.

19. The process of claim 16 wherein the cross-linking compound comprises p-bis(dimethylsilyl)benzene.

20. The process of claim 1 wherein the cross-linking compound comprises diphenylsilane.

21. The process of claim 1 wherein the cross-linking compound comprises hexamethyltrisiloxane.

22. The process of claim 1 wherein the cross-linking compound comprises a mixture of cross-linking compounds selected from the group consisting of: hexamethyltrisiloxane, diphenylsilane, bis(dimethylsilyl) benzene.

23. The process of claim 1 wherein the cross-linking compound comprises a silane having at least two silicon hydride functionalities.

24. The process of claim 1 wherein the cross-linking compound further includes a hydrosilyation reaction catalyst.

25. The process of claim 24 wherein the hydrosilyation reaction catalyst comprises a 0.5% platinum-divinyltetramethyldisiloxane complex.

26. The process of claim 1 wherein the cross-linking compound further includes a reaction inhibitor.

27. A process for producing a cured silsesquioxane resin having high fracture toughness and strength without loss of elastic modulus comprising the steps of:
   a) providing a silsesquioxane resin;
   b) fractionating the silsesquioxane resin a plurality of times utilizing an organic solvent;
   c) stripping the silsesquioxane resin of step b) of excess solvent;
   d) selecting an appropriate fraction;
   e) mixing the silsesquioxane resin of step c) with a cross-linking compound to form a curable composition;
   f) curing the curable composition to form a cured resin having a higher fracture toughness than that of the resin of step a).

28. A process for producing a cured silsesquioxane resin having high fracture toughness and strength without loss of elastic modulus comprising the steps of:
   a) providing a silsesquioxane resin comprising polymeric molecular components having a range of molecular weights;
   b) separating the resin into fractions of smaller molecular weight ranges;
   c) selecting the fraction of smaller molecular weight range that upon curing with a cross-linking compound produces a cured resin having a higher fracture toughness and strength than the resin of step a).

* * * * *